(12) United States Patent
Roh

(10) Patent No.: US 6,766,958 B1
(45) Date of Patent: Jul. 27, 2004

(54) HOLOGRAPHIC ROM SYSTEM

(75) Inventor: Jae-Woo Roh, Seoul (KR)

(73) Assignee: Daewoo Electronics Corporation (KR)

(*) Notice: Subject to any disclaimer, the term of this patent is extended or adjusted under 35 U.S.C. 154(b) by 0 days.

(21) Appl. No.: 10/633,154

(22) Filed: Jul. 31, 2003

(30) Foreign Application Priority Data

Apr. 30, 2003 (KR) .................................. 10-2003-27564

(51) Int. Cl.$^7$ .............................................. G06K 19/06
(52) U.S. Cl. ...................................... 235/491; 235/489
(58) Field of Search ................................. 235/491, 489

(56) References Cited

U.S. PATENT DOCUMENTS

| | | | | |
|---|---|---|---|---|
| 4,566,031 A | * | 1/1986 | Kirk | 348/40 |
| 5,675,437 A | * | 10/1997 | Hart et al. | 359/566 |
| 5,789,733 A | * | 8/1998 | Jachimowicz et al. | 235/492 |
| 5,835,470 A | * | 11/1998 | Campbell et al. | 369/103 |
| 6,104,511 A | * | 8/2000 | Hesselink et al. | 359/22 |
| 6,556,531 B1 | * | 4/2003 | Yagi et al. | 369/103 |
| 6,695,213 B2 | * | 2/2004 | Curtis | 235/491 |

* cited by examiner

Primary Examiner—Michael G. Lee
Assistant Examiner—Uyen-Chau N. Le
(74) Attorney, Agent, or Firm—Anderson Kill & Olick, PC

(57) ABSTRACT

A holographic ROM system includes a light source for emitting a laser beam; an expanding unit for expanding the laser beam; and a mask for modulating a certain portion of the expanded laser beam to thereby generate a signal beam which is directly provided to a holographic medium and sifting the remainder portion of the expanded laser beam to thereby generate a reference beam which is provided to a conical mirror reflecting the reference beam toward the holographic medium. The holographic medium is composed of a recording region onto which both the reference beam and the signal beam are projected; and a transparent region which passes through the reference beam sifted by the mask, to thereby provide the reference beam to the conical mirror.

9 Claims, 3 Drawing Sheets

HOLOGRAPHIC ROM SYSTEM

FIELD OF THE INVENTION

The present invention relates to a holographic ROM (read-only memory) system; and, more particularly, to the holographic ROM system capable of achieving an enhanced recording and reading efficiency with a simplified structure.

BACKGROUND OF THE INVENTION

Conventional holographic memory systems normally employ a page-oriented storage approach. An input device such as a SLM (spatial light modulator) presents recording data in the form of a two dimensional array (referred to as a page), while a detector array such as a CCD camera is used to retrieve the recorded data page upon readout. Other architectures have also been proposed wherein a bit-by-bit recording is employed in lieu of the page-oriented approach. All of these systems, however, suffer from a common drawback in that they require the recording of a huge number of separate holograms in order to fill the memory to capacity. A typical page-oriented system using a megabit-sized array would require the recording of hundreds of thousands of hologram pages to reach the capacity of 100 GB or more. Even with the hologram exposure times of millisecond-order, the total recording time required for filling a 100 GB-order memory may easily amount to at least several tens of minutes, if not hours. Thus, another conventional holographic ROM system such as FIG. 1 has been developed, where the time required to produce a 100 GB-order capacity disc may be reduced to under a minute, and potentially to the order of seconds.

The conventional holographic ROM system of FIG. 1 includes a light source 100, HWPs (half wave plates) 102, 112, an expanding unit 104, a PBS (polarizer beam splitter) 106, polarizers 108, 114, mirrors 110, 116, a mask 122, a hologram medium 120, and a conical mirror 118.

The light source 100 emits a laser beam with a constant wavelength, e.g., a wavelength of 532 nm. The laser beam, which is of only one type of linear polarization, e.g., P-polarization or S-polarization, is provided to the HWP 102. The HWP 102 rotates the polarization of the laser beam by θ degree (preferably 45°). And then, the polarization-rotated laser beam is fed to the expanding unit 104 for expanding the beam size of the laser beam up to a predetermined size. Thereafter, the expanded laser beam is provided to the PBS 106.

The PBS 106, which is manufactured by repeatedly depositing at least two kinds of materials each having a different refractive index, serves to transmit one type of polarized laser beam, e.g., P-polarized beam, and reflect the other type of polarized laser beam, e.g., S-polarized beam. Thus the PBS 106 divides the expanded laser beam into a transmitted laser beam (hereinafter, a signal beam) and a reflected laser beam (hereinafter, a reference beam) having different polarizations, respectively.

The signal beam, e.g., of a P-polarization, is fed to the polarizer 108, which removes imperfectly polarized components of the signal beam and allows only the purely P-polarized component thereof to be transmitted therethrough. And then the signal beam with perfect or purified polarization is reflected by the mirror 110. Thereafter, the reflected signal beam is projected onto the holographic medium 120 via the mask 122. The mask 122, presenting data patterns for recording, functions as an input device, e.g., a spatial light modulator (SLM).

On the other hand, the reference beam is fed to the HWP 112. The HWP 112 converts the polarization of the reference beam such that the polarization of the reference beam becomes identical to that of the signal beam. And then the reference beam with converted polarization is provided to the polarizer 114, wherein the polarization of the reference beam is more purified. And the reference beam with perfect polarization is reflected by the mirror 116. Thereafter, the reflected reference beam is projected onto the conical mirror 118 (the conical mirror 118 being of a circular cone having a circular base with a preset base angle between the circular base and the cone), which is fixed by a holder (not shown). The reflected reference beam is reflected toward the holographic medium 120 by the conical mirror 118. The incident angle of the reflected reference beam on the holographic medium 120 is determined by the base angle of the conical mirror 118.

The holder for fixing the conical mirror 118 should be installed on the bottom side of the conical mirror 118, in order to prevent the reference beam from being blocked by the holder. Since the holder should be placed on the bottom side of the conical mirror 118, it is usually installed through a center opening 124 of the holographic medium 120.

The holographic medium 120 is a disk-shaped material for recording the data patterns. The disc-sized mask 122 provides the data patterns to be stored therein. By illuminating the mask 122 with a normally incident plane wave, i.e., the signal beam, and by using the reference beam incident from the opposite side to record holograms in the reflection geometry, the diffracted pattern is recorded in the holographic medium 120. A conical beam shape is chosen to approximate the plane wave reference beam with a constant radial angle at all positions on the disc, such that the hologram can be read locally by a fixed-angle narrow plane wave while the disc is rotating during playback. Furthermore, an angular multiplexing can be realized by using the conical mirror 118 with a different base angle (see "Holographic ROM system for high-speed replication", 2002 IEEE, by Ernest Chuang, et al.).

By using the above-mentioned scheme, the time required to produce a fully recorded 100 GB-order capacity disc may be reduced to less than a minute, and potentially to an order of seconds.

However, there are critical problems in the prior art system;

First, the conventional holographic ROM system of FIG. 1 has a complicated structure. That is, the conventional holographic ROM system requires numerous components including the PBS 106, the HWPs 102, 112, the mirrors 110, 116, and the polarizers 108, 114 increasing the manufacturing cost thereof.

Secondly, replacement of the conical mirror 118 for angular multiplexing can be highly cumbersome. Since the holder is packed into a compact space between the holographic medium 120, the conical mirror 118 and the mask 122, the alignment between the holographic medium 120 and the mask 122 can be easily disturbed whenever the conical mirror 118 is replaced for the angular multiplexing, complicating the replacement process of the conical mirror 118.

SUMMARY OF THE INVENTION

It is, therefore, an object of the present invention to provide a holographic ROM system with a simplified structure, which also enables a conical mirror to be replaced easily for angular multiplexing.

In accordance with the present invention, there is provided a holographic ROM system including: a light source for emitting a laser beam; an expanding unit for expanding the laser beam; and a mask for modulating a certain portion of the expanded laser beam to thereby generate a signal beam which is directly provided to a holographic medium and sifting the remainder portion of the expanded laser beam to thereby generate a reference beam which is provided to a conical mirror reflecting the reference beam toward the holographic medium, wherein the holographic medium includes: a recording region onto which both the reference beam and the signal beam are projected; and a transparent region which passes through the reference beam sifted by the mask, to thereby provide the reference beam to the conical mirror.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
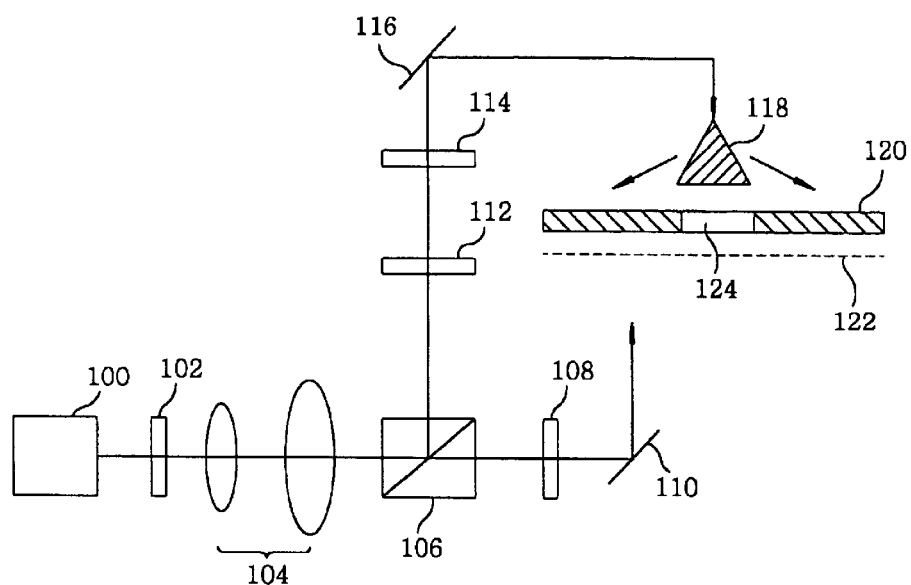
FIG. 1 shows a conventional holographic ROM system.
Figure 2:
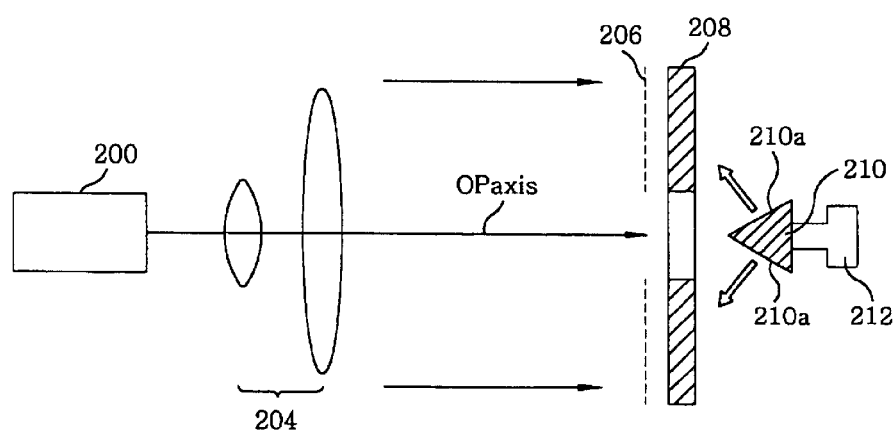
FIG. 2 describes a holographic ROM system in accordance with a preferred embodiment of the present invention.
Figure 3A:
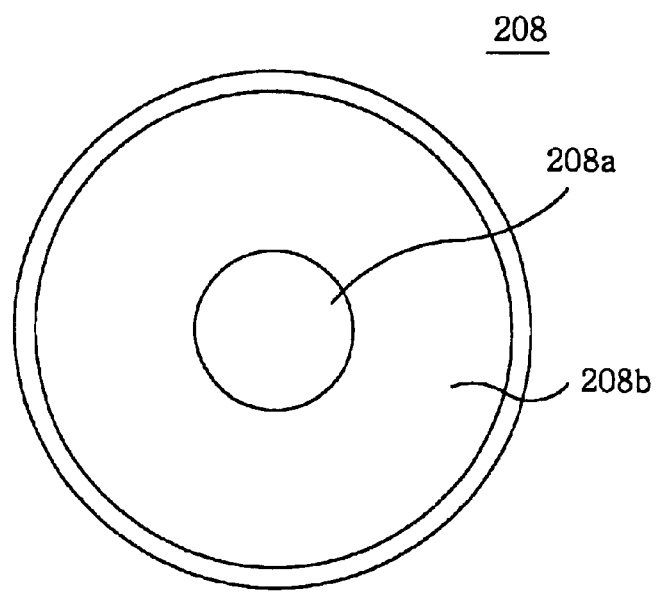
FIG. 3A represents a plane view of a holographic medium included in the holographic ROM system of FIG. 2.
Figure 3B:
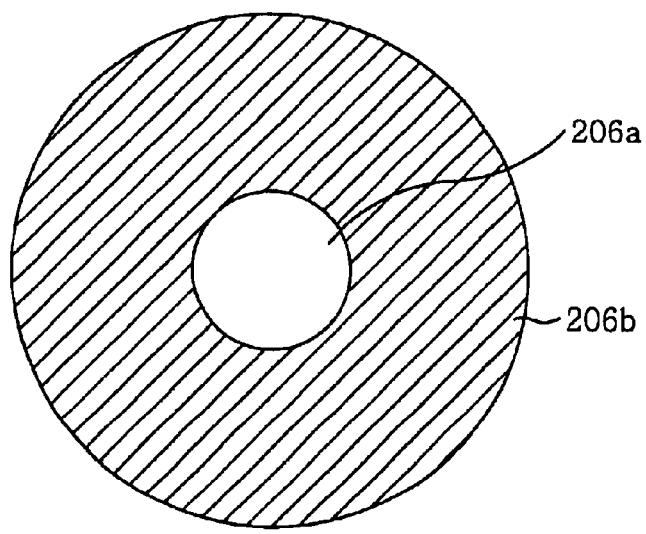
FIG. 3B offers a plane view of a mask included in the holographic ROM system of FIG. 2.

FIG. 2 shows a holographic ROM system in accordance with a preferred embodiment of the present invention. The holographic ROM system includes a light source 200, an expanding unit 204, a mask 206, a holographic medium 208, and a conical mirror 210, disposed in that order along a straight main optical axis, i.e., OPaxis. The holographic medium 208 preferably has a CD-like disc shape and is provided with a transparent region 208a at the center thereof for passing therethrough a reference beam toward the conical mirror 210 and an annular-shaped recording region 208b therearound as shown in FIG. 3A. The mask 206 serves to generate a data pattern for recording as in the conventional mask 122 of FIG. 1, but differs therefrom in that the mask 206 is provided with a beam passing region 206a and a data pattern region 206b as shown in FIG. 3B. The beam passing region 206a is located at the central region of the mask 206 and serves to pass the reference beam therethrough toward the conical mirror 210 via the transparent region 208a of the holographic medium 208, as will be described in more detail hereinafter. The data pattern region 206b, having an annular shape, is provided around the beam passing region 206a. The beam passing region 206a may be a simple open hole or be made of a transparent material or a combination thereof. The mask 206 can be of a type having the regions 206a and 206b of fixed sizes to be used only for a specific type of the holographic medium 208 or can be configured to vary the sizes thereof adaptive to various types of the holographic medium 208. In any case, it is preferable that the sizes of the transparent region 208a and the recording region 208b be identical to those of the beam passing region 206a and the data pattern region 206b, i.e., the inner and the outer diameters of the recording region 208b equaling to those of the data pattern region 206b.

As shown in FIG. 2, the light source 200 emits a laser beam with a certain beam size and a constant wavelength, e.g., of 532 nm. The laser beam is fed to the expanding unit 204 which expands the width of the laser beam to provide a collimated beam of plane wave. The expanded laser beam preferably covers the whole area of the beam passing region 206a and the data pattern region 206b but with a diameter size close to the outer diameter of the recording region 208b and a uniform intensity to maximize the optical and the recording efficiencies.

Figure 3C:
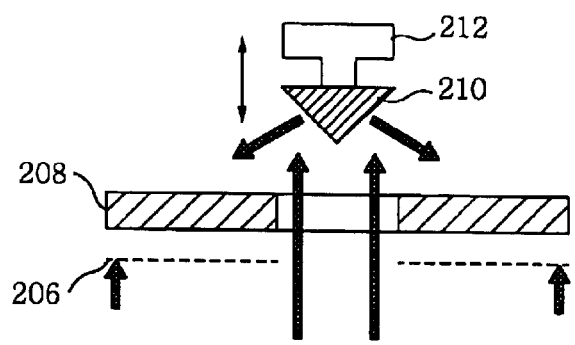
FIG. 3C illustrates a recording mechanism in accordance with the preferred embodiment of the present invention.

As shown in FIG. 3C, the whole expanded laser beam is directly forwarded to the mask 206 and then provided to the holographic medium 208 through two optical paths. A first path is that the outer portion of the expanded laser beam is fed to the data pattern region 206b of the mask 206 and then projected onto the holographic medium 208 through a first surface facing the mask 206. And a second path is that the inner portion of the expanded laser beam passes through the transparent region 208a of the holographic medium 208 via the beam passing region 206a of the mask 206 and then reflected by the conical mirror 210 and then projected to the holographic medium 208 through a second surface opposite the mask 206. The laser beam passing through the beam passing region 206a serves as a reference beam and the laser beam passing through the data pattern region 206b of the mask 206 serves as a signal beam.

The data pattern region 206b of the mask 206 provides a data pattern for writing data in the holographic medium 208. By illuminating the mask 206 with a normally incident plane wave, i.e., the signal beam, and by using the reference beam to record holograms in the reflection geometry, the diffracted pattern of the signal and the reference beam is recorded in the holographic medium 208.

A conical beam shape is chosen to approximate the plane wave reference beam with a constant radial angle at all positions on the recording region 208b of the holographic medium 208. The data can be written on the entire recording region 208b at once by a single shot of laser beam without rotating the holographic medium 208. Such recorded hologram can be read locally by using a reference beam only, which is identical to that employed during the recording process but of a fixed-angle narrow plane wave, while the holographic medium 208 is rotating during playback. That is, the geometry shown in FIG. 2 is used only during the recording operation.

The conical mirror 210 has a reflecting surface 210a of a cone shape facing the holographic medium 208 and is detachably fixed by a holder 212, which maintains the conical mirror 210 at a fixed position by holding same at the back side thereof opposing the holographic medium 208 in order not to block the reference beam. Further, the main optical axis, Opaxis, of the laser beam is to coincide with the symmetry axis of the conical reflecting surface 210a passing through the apex thereof; and the base diameter of the conical reflecting surface 210a is preferably not to be smaller than the diameter of the transparent region 208a to maximize the optical efficiency. Since the replacement of the conical mirror 210 is executed without disturbing the arrangement between the holographic medium 208 and the mask 206, the conical mirror 210 can be rather easily replaced with another one having a different base angle for multiplexing.

Since the reference beam shares the optical axis of the signal beam (i.e., the main optical axis "Opaxis") until it reaches the conical mirror 210, without being split therefrom, the present invention can be implemented by employing only the light source 200, the expanding unit 204, the mask 206, the holographic medium 208, and the conical mirror 210, without having to use the HWPs 102, 112, the PBS 106, the polarizers 108, 114, and the mirrors 110, 116 of the prior art shown in FIG. 1. Therefore, the structure of the holographic ROM system of the present invention is greatly simplified, resulting in a significant reduction of the manufacturing costs.

Figure 3D:
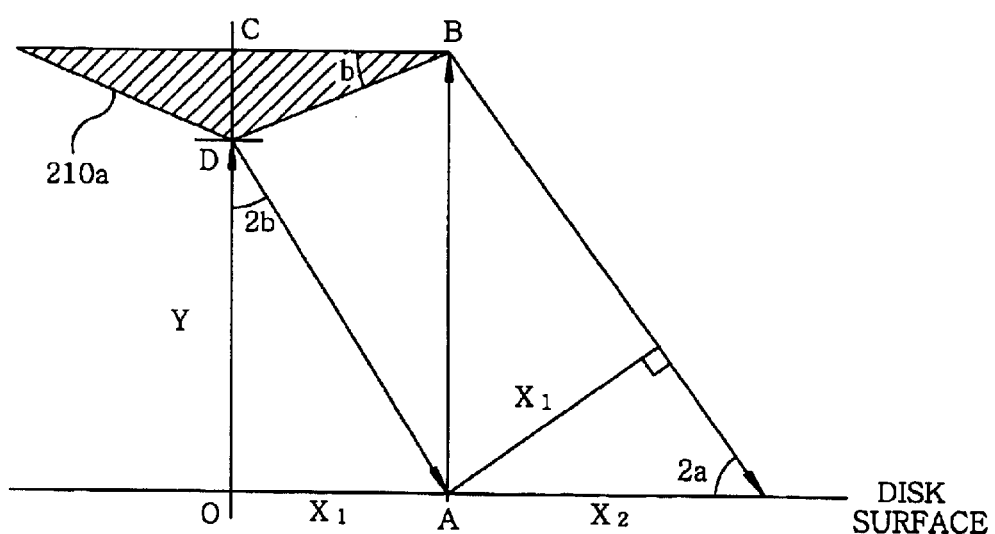
FIG. 3D explains paths of the reference beam between a conical mirror and the holographic medium in accordance with the preferred embodiment of the present invention.

FIG. 3D provides the path of the reference beam between the conical mirror 210 and the holographic medium 208 in accordance with the preferred embodiment of the present invention. If the incident angle between a direction of the incident reference beam and a surface of the holographic medium 208 is set to be $\angle 2a$ and an angle $\angle DBC$, i.e., the base angle of the conical reflecting surface 210a is $\angle b$, the angles $\angle ODA$ and $\angle DAO$ equal $\angle 2b$ and $\angle 2a$, respectively. Thus, it can be seen that:

$$\angle a + \angle b = 45° \qquad \text{Eq. 1}$$

In case the reference beam with a radius of X1 is reflected by the conical mirror 210 and illuminated onto the holographic medium 208, the beam size (i.e., width) X2 of the reflected reference beam of the conical beam shape on the holographic medium 208 can be defined as:

$$X2 = X1/\sin 2a \qquad \text{Eq. 2}$$

In case the size of the recording region 208b (i.e., the width thereof being equal to one-half of the difference between the outer and the inner diameters thereof) of the holographic medium 208 is X3, X2 needs to be equal to or larger than X3 in order to write data on the recording region 208b at once. Then, the relationship between X1 and X3 can be defined as:

$$X2 = X1/\sin 2a \geq X3 \qquad \text{Eq. 3}$$

Thus, the angle $\angle a$ can be defined in terms of X1 and X3 as:

$$\angle 2a < \sin^{-1}(X1/X3) \qquad \text{Eq. 4}$$

Therefore, if $\angle 2a$ is determined by Eq. 4, a suitable base angle $\angle b$ of the conical reflecting surface 210a can be obtained.

The location on the holographic medium 208, where the incident reference beam is projected, may vary with the distance between the conical mirror 210 and the holographic medium 208. In order for the size X2 of the reflected beam on the holographic medium 208 to coincide with that of the recording region 208b thereof or in order for the central ray of the reference beam to pass through the inner boundary of the recording region 208b, the distance 'Y' between the apex of the conical reflecting surface 210a and the holographic medium 208 can be defined as:

$$Y = X1 \cdot \tan 2a \qquad \text{Eq. 5}$$

While the invention has been shown and described with respect to the preferred embodiments, it will be understood by those skilled in the art that various changes and modifications may be made without departing from the spirit and the scope of the invention as defined in the following claims.

What is claimed is:

1. A holographic ROM system comprising:

a light source for emitting a laser beam;

an expanding unit for expanding the laser beam; and a mask for modulating a certain portion of the expanded laser beam to thereby generate a signal beam which is directly provided to a holographic medium and sifting the remainder portion of the expanded laser beam to thereby generate a reference beam which is provided to a conical mirror reflecting the reference beam toward the holographic medium, wherein the holographic medium includes: a recording region onto which both the reference beam and the signal beam are projected; and a transparent region which passes through the reference beam sifted by the mask, to thereby provide the reference beam to the conical mirror.

2. The holographic ROM system of claim 1, wherein the transparent region is located at the center of the holographic medium for passing therethrough the reference beam toward the conical mirror and the recording region having an annular-shape is located around the transparent region.

3. The holographic ROM system of claim 1, wherein the mask includes a data pattern region for modulating the certain portion of the laser beam and a beam passing region for sifting the remainder portion of the laser beam.

4. The holographic ROM system of claim 3, wherein the size and the shape of the beam passing region equals to those of the transparent region of the holographic medium.

5. The holographic ROM system of claim 1, wherein the conical mirror is fixed by a holder which is installed on the back side of the conical mirror.

6. The holographic ROM system of claim 1, wherein the conical mirror is replaced with another one having a different base angle for multiplexing.

7. The holographic ROM system of claim 6, wherein an angle $\angle 2a$ satisfies the relationship of:

$$\angle 2a < \sin^{-1}(X1/X3),$$

wherein $\angle 2a$ is the angle between the proceeding direction of the reference beam and the surface of the holographic medium, X1 is one-half of the full-size of the reference beam which is projected onto the conical mirror, and X3 is one-half of the difference between the outer and the inner diameters of the recording region of the holographic medium.

8. The holographic ROM system of claim 1, wherein the distance between the conical mirror and the holographic medium is varied for multiplexing.

9. The holographic ROM system of claim 8, wherein the distance is determined by the formula of:

$$Y = X1 \cdot \tan 2a,$$

wherein X1 is one-half of the full-size of the reference beam which is projected onto the conical mirror, and $\angle 2a$ is the angle between the proceeding direction of the reference beam and the surface of the holographic medium.

* * * * *